J. T. WELCH.
LINE DISTRIBUTING DEVICE FOR REELS.
APPLICATION FILED MAY 9, 1921.

1,438,007.

Patented Dec. 5, 1922.

Inventor:
John T. Welch

Patented Dec. 5, 1922.

1,438,007

UNITED STATES PATENT OFFICE.

JOHN T. WELCH, OF DOWAGIAC, MICHIGAN, ASSIGNOR TO JAMES HEDDON'S SONS, OF DOWAGIAC, MICHIGAN, A CORPORATION OF MICHIGAN.

LINE-DISTRIBUTING DEVICE FOR REELS.

Application filed May 9, 1921. Serial No. 468,000.

*To all whom it may concern:*

Be it known that I, JOHN T. WELCH, a citizen of the United States, residing at Dowagiac, in the county of Cass and State of Michigan, have invented certain new and useful Improvements in a Line-Distributing Device for Reels, of which the following is a specification.

This invention relates to an improved line distributing device for reels, such, for instance, as fishing reels, the present construction being distinctly economical to manufacture, as well as simple, certain and durable in operation. The various advantages to be derived from my invention will appear hereinafter from the specification and claims, and from the accompanying drawing wherein a fishing reel equipped with the present line distributing device is shown in the manner following:

Figure 1:
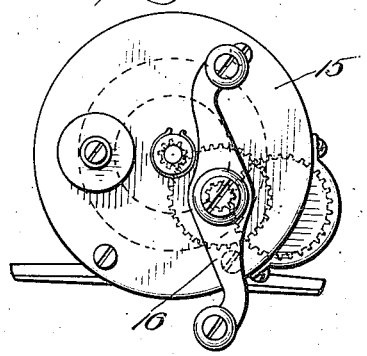
Figure 1 is an end elevation thereof.

The principal parts of the fishing reel herein illustrated include a pair of spaced head plates 10 and 11 between which are spool and cam shafts 12 and 13 respectively, as well as the usual pillars 14. Associated with the head plate 10 is a chamber 15 within which may be arranged a driving connection between the two shafts to which rotation is imparted through the medium of a crank 16.

Figure 5:
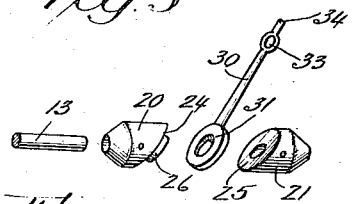
Fig. 5 is a detail in perspective of the component parts of the cam mechanism shown in disassembled relation.

Mounted on the shaft 13 are two generally cylindrical elements 20 and 21 which co-operate to provide a cam. Through each of these elements is formed an axial bore for the shaft 13, any appropriate means, such as pins 22, being employed to lock the elements fast thereto. By reference to Fig. 5 it will be noted that the meeting faces 24 and 25 of these elements are plane surfaces obliquely inclined, and that a cylindrical hub 26 extends from the one face 24 to the other to thereby space apart the two cam elements. From this it results that the hub 26 lies between bordering walls, the geometric axis of this hub being perpendicular to each of the two faces 24 and 25, and angularly related to the axis of the shaft 13 so as to intersect the same; and it results further that the plane surfaces forming these two faces are elliptical in contour, owing to their obliquity to the axis of the elements 20 and 21.

Figure 2:
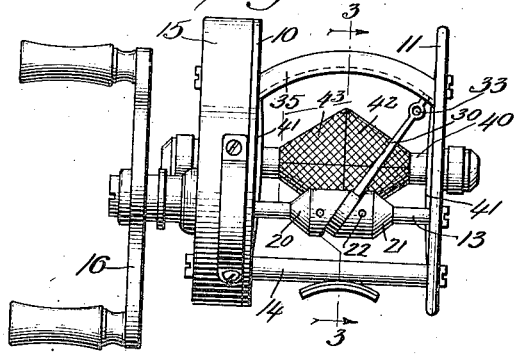
Fig. 2 is a side elevation thereof.
Figure 3:
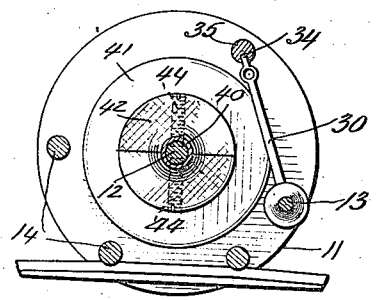
Fig. 3 is a transverse section therethrough on line 3—3 of Fig. 2.
Figure 4:
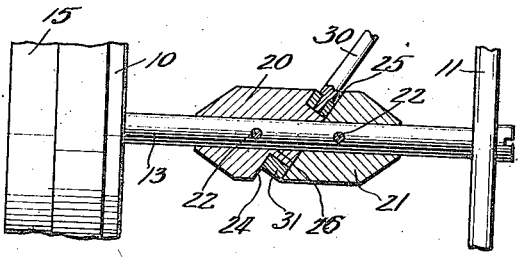
Fig. 4 is an enlarged detail showing the cam mechanism which is part of the line distributing device.

Associated with the cam shaft is a distributing or spooling arm 30 having a bearing 31 in the form of a ring within which is received the hub 26. This bearing has a lateral dimension substantially equal to the distance between the oblique faces, so that, when assembled on the cam, the arm is projected therefrom in a direction which is always transverse to the axis of the hub 26. Near its free end the spooling arm is formed with a loop 33 beyond which its extremity 34 is disposed within a guide 35 which extends between the two head plates of the reel. As shown in Figs. 2 and 3, this guide may be channeled and in the form of an arc whose center lies at the intersection of the axes of the hub 26 and shaft 13.

From the preceding description it will be observed that with rotation of the shaft 13 the two cam surfaces are also revolved but through constantly shifting planes due to corresponding changes in the direction of the axis of the hub 26. The effect of such movements is to oscillate and twist the spooling arm 30, so as to swing its loop end back and forth and around within the channeled guideway from one end of the reel to the other. These movements of the spooling arm within the arc of its guideway are characterized by variations in speed, particularly noticeable at the end of each stroke where a distinct pause occurs, and inasmuch as the line which is to be wound upon the reel is being drawn constantly through the loop 33, there results a tendency to build the windings higher at the reel ends than elsewhere. To overcome this, I have arranged upon the shaft 12 a spool 40 which is provided with end flanges 41 and in the central region of the spool an arbor 42 in the general shape of a double cone whose diameter is greatest in the middle region of the reel, all as clearly shown in Figs. 2 and 6. Preferably the surfaces of this arbor are knurled as at 43, or otherwise formed to hold the line windings from lateral shifting during rotation of the spool. To facilitate the assembly of the arbor upon the spool, I would split the double cone in the direction of its length (see Fig. 3) and after placing each half in position upon the spool secure the same thereupon as by means of screws 44. By reason of this construction, the line which is being wound upon the constantly revolving spool under the guidance of the spooling arm is held for a longer period of winding at the ends of the spool where its diameter is smallest and is correspondingly hastened in its travel across the central region of the spool where its diameter is greatest. The net result, therefore, of combining a spool so formed with the present line distributing device is to build up the line windings in a way which approaches the level as the spool becomes full.

Figure 6:
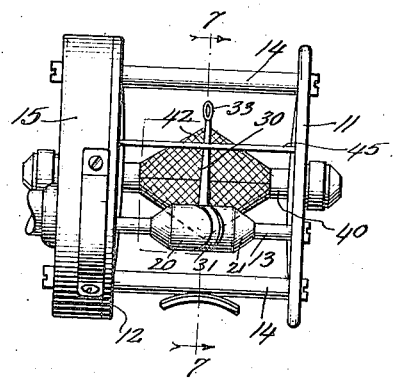
Fig. 6 is a side elevation of a fishing reel equipped with a modified guide for the distributing arm.
Figure 7:
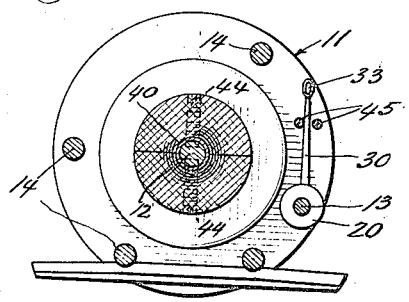
Fig. 7 is a transverse section therethrough taken on line 7—7 thereof.

The channeled guide 35 shown in Fig. 2 is illustrative of one means which may be employed in combination with the cam mechanism to assure oscillation of the spooling arm in a single plane. An equally serviceable guide construction is shown in Figs. 6 and 7 wherein the cam mechanism may be the same. In these figures, however, I have shown a pair of spaced guide bars 45 extending between the reel ends in operative relation to the spooling arm which is projected therebetween. As the spooling arm is oscillated, its loop end will swing through the arc whose plane lies between these bars so as to guide the line in its windings upon the reel which is equipped with a spool of the kind hereinbefore described. Whether this guide be of channel formation, as shown in Fig. 2, or comprise a pair of spaced bars, as shown in Fig. 7, the spooling arm in oscillating therebetween will be free to move back and forth, and at the end of each stroke to twist around to the angular position which it is required to assume on its return stroke. Such guiding means, irrespective of its form, may serve also as a supplementary pillar for the purpose of connecting the head plates of the reel, as clearly shown in the drawing.

The present reel possesses certain very distinct advantages in that it may be inexpensively produced and be assembled with a minimum of expense. Unlike the so-called level winding mechanisms that are common to reels, the parts of my construction are amply proportioned to take care of wear received in usage, so that the device should be very durable in service. The rotative movements of the elliptical cam surfaces around the arm bearing act to clean out any dirt or grit that might lodge in such places, thus conducing to preservation of the parts against undue wear.

I claim:

1. In combination with a reel, a line distributing device therefor comprising a shaft connected to rotate with the reel, a cam mounted to revolve with the shaft and having the formation of a cylindrical hub with its geometric axis angularly related to the shaft axis, a spooling arm adapted for oscillation by the cam and projected therefrom in a plane which is transverse to its geometric axis, and means associated with the arm to confine its oscillations within a single plane about an axis which intersects that of the shaft, substantially as described.

2. In combination with a reel, a line distributing device therefor comprising a cam mounted to revolve with the reel and formed with a geometric axis which is angularly related to its axis of rotation, a spooling arm adapted for oscillation by the cam, and means associated with the arm to confine its oscillations within a single plane about an axis which intersects that of the shaft, substantially as described.

3. In combination with a reel, a line distributing device therefor comprising a shaft connected to rotate with the reel, a cam arranged to revolve with the shaft and comprising two generally cylindrical elements mounted on the shaft each formed with an oblique cam surface which is parallel to and spaced from the other, a cylindrical hub extended from the cam surface of the one element to the corresponding surface of the other element with its geometric axis angularly related to the shaft axis, the hub being of less diameter than that of the two elements whereby the oblique cam surfaces constitute side walls therefor, a spooling arm having a bearing within which the hub may revolve, and which extends between the two cam surfaces, and guiding means associated with the other end of the arm for confining to a single plane its oscillations which result from rotation of the cam shaft, substantially as described.

4. In combination with a reel, a line distributing device therefor comprising a shaft connected to rotate with the reel, and cam mechanism associated with the shaft including a rotatable cylindrical hub having a geometric axis which intersects its own axis of rotation, and an arm associated with the hub adapted to be oscillated thereby about the center formed by the intersection of said axes, substantially as described.

5. In combination with a reel, a line distributing device therefor comprising a shaft connected to rotate with the reel, an arm having at one end a bearing within which the shaft is rotatably mounted, and means associated with the shaft for imparting to the arm an oscillatory movement as the shaft is revolved, substantially as described.

6. In combination with a reel, a line distributing device therefor connected to operate with rotation of the reel, means for operating said distributing device to impart thereto a variable speed movement, and compensatory means associated with the reel for building toward a uniform diameter thereon the line windings which are guided by the distributing device, substantially as described.

7. In combination with a reel, a spool arranged to receive line windings thereon, an arbor on the spool between its ends and formed with a variable diameter which is greatest midway of its length, a line distributing device drivingly connected with the reel and adapted to operate at variable speeds such that it moves with greatest rapidity when guiding the line over the arbor of the spool, substantially as described.

8. In combination with a reel, a spool mounted thereon, a double cone arbor on the spool, and a line distributing device connected with the reel to operate at variable speeds, the distributing device being adapted to guide a line in its windings upon the spool and moving with greatest rapidity in the region of the arbor thereon, substantially as described.

9. In combination with a reel, a spool carried thereby, a knurled arbor split lengthwise of its length and secured to the reel, and a line distributing device connected with the reel to operate at variable speeds, the movements of the distributing device being fastest when the line is being guided thereby over the arbor, substantially as described.

10. In combination with a reel, a line distributing device therefor comprising a cam mounted to rotate with the reel, the cam being provided with a pair of plane surfaces in parallelism, spaced from each other, and obliquely disposed to its axis of rotation, a cylindrical hub extending between the oblique surfaces with the hub axis angularly related to the cam axis, the oblique cam surfaces constituting end walls for the hub, a spooling arm between the cam surfaces having a bearing within which the hub may revolve, and guiding means associated with the arm for confining to a single plane its oscillations which result from rotation of the cam, substantially as described.

JACK T. WELCH.

Witness:
EPHRAIM BANNING.